United States Patent Office 3,672,957
Patented June 27, 1972

3,672,957
GERMINATION OF SPORES
Lewis G. Scharpf, Jr., Kirkwood, Mo., assignor to
Monsanto Company, St. Louis, Mo.
No Drawing. Filed Jan. 30, 1970, Ser. No. 7,265
Int. Cl. C12b 1/00
U.S. Cl. 195—96   8 Claims

ABSTRACT OF THE DISCLOSURE

This invention relates to methods and compositions for germinating spores of the Bacillus or Clostridium genera utilizing amylases.

BACKGROUND OF THE INVENTION

Field of the invention

This invention relates to the use of enzymes to germinate bacterial spores, more specifically, this invention relates to the use of amylases to germinate such spores and to compositions including such enzymes.

DESCRIPTION OF THE PRIOR ART

Germination is described as an irreversible process in which a number of events take place shortly after exposure of spores to specific stimulants. During this period of time, referred to as the germination phase, the spore loses heat resistance, dipicolinic acid, impermeability to dyes, calcium, refractility and optical density to visible light. The spore is now referred to as a germinated form or a germinated spore. However, all of the above mentioned changes do not take place at the same rate, for example, the complete germination phase for a spore may take two hours, but it may take only one hour for the spore to become heat sensitive whereas it may take two hours for the spore to lose dipicolinic acid. Outgrowth is described as the period of development after the germination phase until the beginning of the first cell division. During this period of time, referred to as the outgrowth phase, the spore core membrane becomes a cell wall of the emerging vegetative cell which then elongates and divides. Vegetative cells sporulate and then the life cycle is repeated.

It is well-known that the vegetative cells from Bacillus or Clostridium spores are responsible for food spoilage including flat sour spoilage and thermophilic anaerobic spoilage. For example, various salad dressing, vegetables and canned milk are spoiled by B. subtilis vegetative cells; likewise, dairy foods are spoiled by B. megaterium and fruits and vegetables by B. stearothermophilus. In order to destroy the non-germinated form of the spores present in food, as is well-known, they must be heated at high temperatures for extended periods of time. By destroying these spores under such severe conditions, generally flavor, texture and vitamin content of the food is adversely affected. One way of reducing these adverse effects is to first germinate the spores to make them heat sensitive so that these forms may be easily destroyed by heating at lower temperatures for shorter periods of time.

It is known that some surface active agents, amines, alkanes or metal chelates induce germination and decrease the period of time necessary for the germination phase, however, some cannot be used to germinate spores to prevent food spoilage because of toxicity characteristics or because they impart undesirable flavor characteristics to the food. Additionally, it is disclosed in U.S. Pat. 3,276,840 that a proteolytic enzyme extracted from bacterial spores of the Bacillus or Clostridium genera such as B. subtilis, for example, can be used directly to induce germination of bacterial spores of the Bacillus and Clostridium genera such as B. subtilis, B. cereus and B. lichenformis. However, it is a time consuming and difficult process to extract the protease enzymes before use, consequently, there may not be a sufficient supply of the enzymes which could be used on a large scale in the food industry. Also, these proteases at such levels might act on and hydrolyze such substrates as meat, milk, poultry, eggs and other proteins to produce undesirable effects and flavor texture of the final product.

It would, therefore, be an advancement in the art to provide a method for the germination of Bacillus and Clostridium spores which decreases the period of time required for the germination phase and which can be advantageously utilized in food preservation with none of the above mentioned disadvantages.

SUMMARY OF THE INVENTION

Briefly, in accordance with this invention, it was found that an amylase enzyme may be used directly to induce germination of bacterial spores of Bacillus and Clostridium genera, such as Bacillus subtilis, Bacillus megaterium, Bacillus stearothermophilus, for example, with corresponding decreases in the time required for the germination phase.

In another embodiment of this invention, the time required for the germination phase is further decreased by combining an amylase and either a physiological germinant, for example, amino acids or sugars or a supplemental enzyme hereinafter set forth or both. In still another embodiment of this invention, a process is provided where the spores are first germinated and then the germinated forms are treated with heat or ionizing radiation such as gamma radiation or high energy electrons to destroy these germinated forms of the spores. Finally, in another embodiment of this invention, a process is provided wherein the spores before germination are treated with sublethal heat to decrease the time required for the germination phase of such spores.

By utilizing one of the processes in accordance with this invention, the spores of the Bacillus or Clostridium genera are germinated with a corresponding decrease in the time needed for the germination phase. Additionally, the spores become heat sensitive at the same rate or before many of the other mentioned characteristic changes of germination. This is a substantial advantage in food processing, for as soon as the spores become heat sensitive, they may be destroyed, which decreases the overall processing time required for food. Another unexpectant advantage found using one of the processes of this invention was that a percentage of the spores undergoing germination were rendered not viable, i.e., not able to continue their development in the outgrowth phase. This is another substantial advantage in food processes, as in some cases, further preservation steps may not be needed. The amylases advantageously utilized in accordance with one of the processes of this invention are readily available in large supplies. Such enzymes have none of the undesirable side effects such as toxicity and therefore can be used in preserving food. Also, such enzyme combinations will not produce undesirable side effects generally encountered by using large quantities of proteases. When the processes of this invention are utilized to germinate the spores and subsequently to destroy them in preserving food, the vitamin retention, texture, and flavor characteristics are generally not adversely affected.

Additionally, it is known that members from the Bacillus genera cause undesirable effects such as the formation of slime in high octane hydrocarbon fuels which may lead to the malfunctioning of combustion jet engines and subsequently to disruption of the aircraft using a hydrocarbon fuel in which such a slime has formed. By utilizing the process of this invention, spores of the Bacillus genera may be germinated and this germinated form easily destroyed by heating at low temperatures. Consequently, the problem of slime may be substantially reduced or eliminated.

DETAILED DESCRIPTION OF THE INVENTION

As mentioned hereinbefore in the practice of this invention, the germinating agents which may be employed are amylases or combinations of amylases with either physiological germinants or supplemental enzymes or both.

Amylases that are utilized according to the invention may be obtained from plants, animals or micro-organisms. Generally, it is preferred to use amylases obtained from micro-organisms as such amylases are readily available from said micro-organisms by using standard fermentation techniques.

The micro-organisms that may be used to supply the amylases including $\alpha$ and $\beta$ amylases and amyloglucosidases may be of a fungal origin or bacterial origin. Those of fungal origin include Aspergillus and Rhizopus. Examples of particular species include *Rhizopus delemar*, *Aspergillus niger*, *Aspergillus awamori* and *Aspergillus oryzae*. Those of bacterial original include the Bacillus genera, including various strains of *B. subtilis* such as *B. subtilis* strain NRRL B–3411 (U.S. Department of Agriculture Collection, Peoria, Ill.), *B. subtilis* strain NRRL 644 and *B. subtilis* strain IAM 1523 (Japanese Culture Collection) and *B. stearotheromphilus* $\alpha$ amylase is preferred.

The actual amounts of amylase which are used to germinate spores, according to the practice of this invention, will depend, to some extent, upon the spores being germinated. In most instances, the effective concentration is such that the amylase is present in an amount to provide about 500 units of activity per $10^3$ to $10^9$ spores. Amylase present in an amount to provide less than 500 units of activity was found not to significantly decrease the time needed for the germination phase. There is no upper limit on the amount of amylase that may be present to decrease the time required for the germination phase, except as dictated by practicalities of cost and flavor, for example, an amount of amylase present to provide 5,000,000 uints of activity per $10^3$ to $10^9$ spores may be suitably employed. It is preferred in most instances, that the amylase be present to provide about 10,000 units of activity to about 1,000,000 units of activity per $10^3$ to $10^9$ spores.

Amylase activity is generally determined by the well-known dinitrosalicyclic acid method of Bernfeld as described in Methods of Enzymology, Academic Press, 1955, II p. 949. According to this test, amylase catalyzes the hydrolysis of the starch to reducing sugar at a given time and temperature. The reaction is stopped and color developed by the adition of dinitrosalicyclic acid. The optical density of the solution is estimate from a standard curve prepared with known amounts of maltose hydrate. In this application, when units of activity of amylase are stated, it is understood that the Bernfeld technique is employed to determine such activity.

These physiological germinants that may be used in the practice of this invention include sugars, amino acids and nucleosides. Examples of sugars include glucose, maltose, lactose and sucrose. Examples of amino acids include tyrosine, L-alanine, DL-valine, DL-cysteine, methionine, glutamic acid, L-arginine, L-phenyl-alanine, L-leucine, L-tryptophane, aspartic acid, glycine, lysine, L-isoleucine, histidine, serine, threonine, and proline. Examples of nucleosides include inosine, guanosine and adenosine. Glucose, L-alanine and inosine are preferred.

Some of these physiological germinants are more specific for germinating certain spores and depending on the spore to be germinated, faster times for the germination phase are obtained. For example, the spores of *B. subtilis* and *B. stearothermophilus* are germinated faster employing glucose or L-alanine or a combination thereof. However, in the case of *B. megaterium* spores, a faster germination time is obtained employing the physiological germinant inosine.

The amount of the physiological germinant utilized according to this invention will depend to some extent, upon the particular germinant and the spores to be germinated. An effective concentration of the physiological germinant is at least .001 mg. per $10^3$ to $10^9$ spores. In most instances, it was found that an amount below .001 mg. does not sufficiently decrease the time required for the germination phase. Generally, the preferred range is from about 0.01 mg. to about 10 mg. per $10^3$ to $10^9$ spores. Although the physiological germinants may be used in amounts above 10 mg., for example 25 mg., usually it is without commensurate advantage. In the case of L-alanine, for example, an amount of about 2 to about 5 milligrams/$10^3$ to about $10^9$ is especially preferred. In the case of glucose and inosine, about 0.05 to about 0.4 mg./$10^3$ to $10^9$ spores is especially preferred.

By combining amylase with supplementary enzymes to germinate spores, the time required for the germination phase is further decreased. These include the well-known enzymes such as proteases, phosphatases or mixtures of the foregoing. However, lipase is specifically excluded as it is covered in my copending application, filed concurrently herewith. Alkaline protease (hereinafter described) is preferred.

These enzymes useful in this invention may be obtained from animals, plants or micro-organisms. It is preferred to use enzymatically active substances of a microbial origin, and more preferred to use those of a bacterial origin as they can be economically produce in appreciable amounts. These bacteria produce either a single enzyme or a mixture of enzymes.

Examples include Bacillus, Aspergillus or Streptomyces micro-organisms including various *B. subtilis* strains such as *B. subtilis* strain NRRL B–3411 (U.S. Department of Agriculture collection, Peoria, Ill.) *B. subtilis* strain NRRL 664, *B. subtilis* strain IAM 1523 (Japanese Culture Collection) all of which produce a mixture of proteases and amylase. Other organisms include *B. thermoproteolyticus*, *Streptomyces griseus*, *Aspergillus oryzae*, *Streptomyces rectus*, *Streptomyces naraensis*, and *B. subtilis* var. *amylosacchariticus*, all of which produce either a mixture of protease and amylase or only neutral protease. *Streptomyces griseus* strain K–1 produces a predominantly neutral protease.

Neutral protease as used in this application refers to a metallo-enzyme which has its optimum activity at a pH of about 6 to about 8, is inhibited by metal-chelating agents but unaffected by such inhibitors as di-isoproply fluoro phosphate (DFP) and hydrolyzes substrates such as furylacryloylglycyl-L-leucine amide (FAGLA), but does not possess activity against esters such as P-nitrophenyl acetate or N-CBZ-glycine p-nitrophenyl ester. A metallo-enzyme is one containing metal essential for activity. Alkaline protease as used in this application refers to any enzyme which has its optimum activity at a pH of about 8 to about 11, is inhibited by DFP, but not by metal chelating agents and possesses activity against esters such as N-CBZ-glycine p-nitro-phenyl ester, but not against FAGLA.

A particularly good source of the enzymatically active substance is an enzyme mixture produced by *Bacillus subtilis* strain NRRL B–3411. A process for producing this organism and enzyme therefrom is described in U.S. Pat. 3,031,380. The enzymatically active substance produced by this organism has been found generally to consist of two proteases, neutral protease, alkaline protease, and amylase. There are generally about 700 thousand to about 2 million casein units of neutral protease activity per gram of isolated solids and about 250 thousand to about 500 thousand casein units of alkaline protease activity per gram as determined by a casein digestion technique (hereinafter to be described). There are about 300 thousand to about 500 thousand units of amylase as determined by the Bernfeld method. As pointed out in the cited patent, the relative proportions of protease to amylase will vary depending on the exact conditions of growth of the micro-organism, but it has been found that the neutral and alkaline protease and the amylase will be produced, in at least some amounts, almost regardless of changes in the culture medium and other conditions of growth of the micro-organism.

Various analytical methods are available for determining enzyme activity, for example, protease activity can be determined by well-known protein digestion methods using protein substrates such as casein, hemoglobin, bovine serum albumin or gelatin. According to such tests, a protease catalyzes the hydrolysis of a protein (for example, casein) for a certain period of time under controlled conditions of temperature, pH and substrate concentration; the reaction is stopped by addition of trichloroacetic acid, and the solution filtered. The solubilized fragments in the filtrate are determined either by measurement of absorbance in the ultra-violet range or rendered visible by reaction with Folin phenol reagent, and absorbance measured in the visible range and enzyme activity expressed in terms of tyrosine equivalents. This method is more fully described in the Journal of General Physiology, 30 (1947) 291 and in Methods of Enzymology, 2, New York: Academic Press 1955, 33.

In this application when neutral protease activity is expressed in casein units, it is understood that such activity is determined at pH 7, and when alkaline protease is expressed in casein units, it is understood that such activity is determined at pH 10.

Other methods for determining protease activity make use of low molecular weight substrates in spectrophotometric assays, for example, the substrate FAGLA is specific for neutral protease and is used to determine neutral protease activity as described in Biochemical Biophysical Research Communications, 32 326 (1968).

The neutral protease as a group possess different specificity from the alkaline protease as a group. For example, alkaline protease possess esterase activity due apparently to their mechanism of action and not to their pH optimum while neutral protease do not. Test demonstrating this fact are more fully described in Arch. Biochem. Biophys. 123 (1968) 572. Various techniques can be utilized to separate different components of mixtures, for example, neutral protease may be separated from enzyme mixtures, by ion exchange chromotography as described in the Journal of Biological Chemistry, 239 (1964 3706) and in Agr. Biol. Chem. 30 (1966) 651.

Alkaline phosphatase has its activity between about pH 7 and pH 11 at 25° C. It can be obtained from the calf intestinal mucosa. It is also produced by $E. coli$. One unit of activity of alkaline phosphatase is defined as that which will hydrolyze one mole of p-nitro-phenyl phosphate in 1 minute at a pH of 10.4 and at a temperature of 37° C.

It should be noted that some of these enzymes are specific for germinating certain types of spores, for example, alkaline protease when combined with amylase gives a faster germination rate for germination of $B. megaterium$ and $B. stearothermophilus$ spores.

The amounts of supplemental enzyme which can be advantageously utilized according to this invention with amylase will depend to some extent upon the particular enzymes and the spores to be germinated. Satisfactory results are obtained, in most instances, in the case of alkaline protease when the effective concentration is such that as little as 100 units of activity are present, in the case of neutral protease when the effective concentration is such that as little as 100 units of activity are present, and in the case of alkaline phosphatase when the effective concentration is such that as little as 200 units of activity are present, all effective concentrations per $10^3$ to $10^9$ spores. Generally, there is no upper limit on the amount of supplemental enzymes that may be utilized except as necessitated by matters of cost and flavor. For example, satisfactory results are obtained when alkaline protease is present in an amount to provide about 1,000,000 units of activity, in the case of neutral protease when it is present in an amount to provide at least 1,000,000 units of activity, and in the case of alkaline phosphatase when it is present to provide about 1,000 units of activity per $10^3$ to $10^9$ spores. It is preferred to use alkaline protease in an amount to provide about 10,000 to about 500,000 units of activity per $10^3$ to $10^9$ spores. It is preferred that neutral protease be present in an amount of from about 10,000 units to about 500,000 units per $10^3$ to $10^9$ spores. It is preferred that alkaline phosphatase be present in an amount to provide about 200 units of activity to about 600 units of activity per $10^3$ to $10^9$ spores.

As mentioned hereinbefore, another embodiment of this invention is a combination of amylase with either a physiological germinant or a supplementary enzyme or both. The compositions may contain any of the hereinbefore mentioned enzymes or a physiological germinant in addition to the amylase.

The compositions contain the components in the effective germinating concentrations hereinbefore mentioned. For example, a composition where amylase is combined with a physiological germinant would contain an effective concentration of the amylase and an effective concentration of the physiological germinant hereinbefore mentioned. When the mixture contained amylase and supplementary enzymes, the composition would contain an effective concentration of the amylase and an effective concentration of the supplemental enzymes pointed out hereinbefore. When the compositions contain the amylase, a physiological germinant and supplemental enzymes, the composition would contain these components in the effective concentrations set forth herein.

Preferred compositions include (1) amylase present in an amount to provide about 10,000 units to about 1,000,000 units of activity per gram of composition, and inosine in an amount of about 100 mg. to about 200 mg. per gram of composition, (2) amylase present in an amount to provide about 10,000 units of activity to about 1,000,000 units of activity per gram of composition, inosine in an amount of about 100 mg. to about 200 mg., per gram of composition and alkaline protease present in an amount to provide about 800,000 units of activity to about 1,200,000 units of activity per gram of the composition, (3) amylase present in an amount to provide about 50,000 units of activity to about 1,000,000 units of activity per gram of the composition, and glucose in an amount of from about 100 mg. to about 200 mg. per gram of the composition, and (4) amylase present in an amount to provide about 50,000 units of activity to about 1,000,000 units of activity, per gram of the composition, glucose in an amount of about 100 mg. to about 200 mg., per gram of the composition and alkaline protease present in an amount to provide about 800,000 units of activity to about 1,200,000 units of activity. Compositions (1) and (2) are especially effective in germinating $B. megatrium$ spores. Compositions (3) and (4) are especially effective in germinating $B. subtilis$ and $B. stearothermophilus$ spores.

In addition to the functional ingredients in the above-mentioned compositions, inert substances or diluents may be employed such as starch and sodium chloride so that the dosages of the composition may be conveniently measured.

PROCESS

As mentioned hereinbefore, the spores of the Bacillus or Clostridium genera may be germinated in any environment by bringing the amylase in contact with the spores. In most instances, however, the enzyme is brought into contact with the spores in the presence of some moisture.

The amount of moisture is not critical, for example, that found in ordinary vegetables such as carrots would be sufficient to bring about the germination in accordance with this invention, on the other hand, the spores could be germinated in the presence of more water, for example, at least 50%. Likewise, when the spores are germinated by an amylase in combination with a physiological germinant or supplementary enzyme or both, the components may be added separately or may be added as one of the novel compositions containing all of the components hereinbefore mentioned.

When the spores are germinated in the presence of moisture, generally, the pH of such aqueous medium is from about 5 to about 10, preferably from about 7 to about 9. This pH can readily be maintained by using any of the normal buffering agents such as the alkali metal phosphates including sodium phosphate, potassium phosphate or any combination thereof.

Generally, in the practice of this invention, the operable range for the temperature is from about $-10°$ C. to about $100°$ C., preferably from about $25°$ C. to about $50°$ C., more preferably from about $35°$ C. to about $45°$ C.

The period of time the amylase or amylase combinations should be in contact with the spores to bring about germination will depend to some extent upon the spores being germinated and the particular combination if such is utilized. The amylase or the amylase combinations should be in contact with the spores for a sufficient time to induce germination. As mentioned hereinbefore, the period of time that the amylase combinations must be in contact with the spores is shorter because these combinations bring about faster germination of the spores. In most instances, a sufficient contact time is at least 5 minutes. As a general rule, it has been found that if the contact time is below 5 minutes, the time required for the germination phase will not be appreciably reduced. Usually, the contact time is from about 15 minutes to about 12 hours. In the case when amylase is used as the germinating agent, the contact time, in most instances, is about 2 hours to about 6 hours. When amylase is combined with a physiological germinant, generally the contact time is from about 30 minutes to about 60 minutes. When amylase is combined with another enzyme, generally, the contact time is from about 20 minutes to about 50 minutes. When amylase is combined with another enzyme and a physiological germinant, the contact time, in most instances is from about 15 minutes to about 30 minutes. Although the contact time may exceed 12 hours, even up to 36 hours, there is no appreciable increase in the extent of germination of the spores.

Once the spores have been germinated using one of the above-mentioned germinating agents, the germinated form may be destroyed utilizing heat and ionizing radiation, for example, which comes from gamma radiation or high energy electrons. Generally, these germinated forms of the spores are heated at a sufficient temperature and for a sufficient period of time to destroy such forms. In most instances, the temperature must be at least $5°$ C. It was found that when temperatures below $5°$ C. were employed, that the germinated forms of the spores were not destroyed. An operable temperature range is from about $20°$ C. to about $120°$ C., preferably from about $60°$ C. to about $85°$ C. Although temperatures above $120°$ C. may be employed to destroy the germinated spore forms even up to $150°$ C., this is without any added advantage. Generally, the spores are heated for a time period of at least 30 seconds. In most instances, it was found that a time period below 30 seconds was not a sufficient time to destroy a great majority of the spore forms. Generally, the germinated spore forms are heated for a period of 1 minute to about 90 minutes, and preferably from about 15 minutes to about 30 minutes. Although the spore can be heated for a period of time above 90 minutes, even up to 180 minutes, generally, this is without any added advantage.

In another embodiment of this invention, the spores may be first preheated with sublethal heat before enzyme treatment. This is heat below that which is required to destroy such spores. The period of time and the temperature, depends to some extent, upon the spores. Generally, in most instances, the temperature is from about $40°$ C. to about $125°$ C., preferably from about $65°$ C. to about $100°$ C., and the period of time is from about 30 seconds to about 60 minutes, preferably from about 10 minutes to about 20 minutes.

The following examples are intended to illustrate the present invention but not to limit the scope thereof.

EXAMPLE I

Preparation of *B. megaterium* spores

A culture of *B. megaterium* is rehydrated, then plated out on 1% casein agar and incubated at $37°$ C. for 24 hours. A transfer from a colony on this plate is made to a trypticase soy agar slant containing 0.5% glucose.

The culture from this slant is transferred into 150 ml. of nutrient broth as described by Rode and Foster Proc. Nat. Acad. Sci., U.S. 46,118, 1960, and having the following formula:

| | | |
|---|---|---|
| Glucose | g | 1.0 |
| $KH_2PO_4$ | g | 4.0 |
| $(NH_4)_2HPO_4$ | g | 1.0 |
| $M_9SO_4$ | g | 0.2 |
| NaCl | g | 1.0 |
| $CaCl_2$ | | 5.0 |
| $MgSO_4 \cdot H_2O$ | mg | 7.0 |
| $ZnSO_4$ | mg | 10.0 |
| $FeSO_4$ | mg | 10.0 |
| Glutamic acid | g | 1.0 |
| Yeast extract | g | 0.5 |
| Agar | gm | 20.0 |
| Deionized $H_2O$ | liter | 1.0 |

A 500 ml. Erlenmeyer flask containing the culture and the broth is placed on a rotary shaker at 300 r.p.m. for 24 hours. Sterile nutrient agar 100 x 15 mm. plates are prepared and inoculated with 0.5–1.0 ml. of active inoculum from the flask and incubated at $3°$ C. for 3 days during which time sporulation takes place.

HARVESTING THE SPORES

After sporulation is complete, autolysis is effected by keeping the plates at $4°$ C. for three days. The plates are flooded with chilled, sterile deionized water to suspend the spores and the spores are collected by centrifugation at $3°$ C. The spores are resuspended in sterile (millipore filtered) lysozyme solution containing 0.5 ml. per milliliter of lysozyme. The temperature is maintained at $37°$ C. and agitation is carried out for 2 hours on a magnetic stirrer. The pH of the suspension is raised to pH 10 to effect further solubilization of vegetative cells. After 5 minutes, the pH is readjusted back to pH 7. The spores are again collected and washed from 6 to 8 times with sterile deionized water. Concentrated spore suspensions are stored in glass bottles at $3°$ C. Spore suspensions are free of non-spore fragments and other debris and contain less than 3% of germinated forms. The spore concentration is determined by a dilution of the heat activated suspension on nutrient agar. Colonies are counted after 24 hours at $30°$ C. The spore concentration is $10^8$ spores/ml. of suspension.

Preparation of *B. subtilis* spores

A slant culture of *B. subtilis* (ATCC7953) is innoculated into 1 liter Roux bottles containing 250 ml. of nutrient agar at a pH of 7.4 supplemented with 0.01 mg./ml. of $MnSO_4 \cdot 1H_2O$ and 8 mg./ml. of NaCl. These bottles were held at $30°$ C. for 3 days.

HARVESTING OF SPORES

The spores are harvested according to the procedure set forth in Example I. Spore concentration is determined by plating a dilution of heat-activated suspensions. Colonies are counted after 24 hours at 30° C. The spores are plated out on nutrient agar.

DETERMINATION OF GERMINATION TIMES

A 10 milliliter aqueous suspension of the spores of *Bacillus megaterium* having a spore concentration of $10^8$/ml. and a pH of about 8.0 buffered with 0.1 M sodium phosphate and a 10 milliliter suspension of *Bacillus subtilis* having a spore concentration of $10^8$/ml. and a pH of about 8.0 buffered with 0.1 M sodium phosphate are prepared. 100 mg. of amylase containing about 67,000 units of $\alpha$ amylase activity is added to each of the suspensions of spores.

The time required for the germination phase measured at 37° C. is followed by measuring the optical density at 660 m$\mu$ in a Bausch and Lomb "spectronic 20," spectrophotometer at various time intervals. These data are plotted as the ratio of $O.D._T/O.D._I$ against time where $O.D._T$ equal optical density at time T and $O.D._I$ equal optical density initial. The period of time required for the enzyme to produce a 50% reduction in optical density is determined.

Germination is also determined by counting the number of refractile and phase dark spores at intervals using the phase contrast microscope.

The above procedure was followed and the half-times given in Table 1. The half-time was also determined for a 10 ml. spore suspension of *B. megaterium* without $\alpha$ amylase and for *B. subtilis* without $\alpha$ amylase.

TABLE 1

| | Half times in minutes | |
|---|---|---|
| | Without $\alpha$ amylase | With $\alpha$ amylase |
| B. megaterium | >500 | 480 |
| B. subtilis | >500 | 480 |

A visual examination also showed that about 50% of the spores in each instance had been germinated.

EXAMPLE II

The procedure of Example I is repeated on *B. megaterium* with the exception that 100 mg. of an enzyme added has 67,000 units of amylase activity, 44,000 units of alkaline protease activity and 80,000 units of neutral protease activity. This enzyme is obtained from *B. subtilis* NRRL B-3411.

Following the above-mentioned procedure, the half-times set forth in Table 2 were obtained.

TABLE 2

| | Half time in minutes | | |
|---|---|---|---|
| | Without amylase (Table 1) | With amylase (Table 1) | With amylase alkaline protease neutral protease |
| B. megaterium | 500 | 460 | 400 |

As can be seen from the above table, when the enzyme having amylase, alkaline protease and neutral protease activity is added to the spores, the time required for germination is still further decreased.

EXAMPLE III

Preparation of *Bacillus Stearothermophilus* spores

A slant culture of *B. stearothermophilus* is transferred to 100 ml. of nutrient broth in a 500 ml. Erlenmeyer flask. The flask is placed on a rotary shaker at 300 r.p.m. for 24 hours. Sterile nutrient agar 100 x 15 mm. plates are inoculated with 0.5-1.0 mls. of the contents of the flask and held for 7 days at 55° C. during which time the organisms sporulate.

HARVESTING THE SPORES

The spores are harvested in the same manner as that for *B. megaterium* spores. The spore concentration is $10^8$ spores/ml. of solution.

To a suitable container containing a 10 ml., aqueous suspension of the spores of *Bacillus megaterium* having a spore concentration of $10^8$/ml. and buffered with 0.1 M sodium phosphate to a pH of 8 is added 1 $\mu$M per ml. of spores of the physiological germinant inosine. To another 10 ml. aqueous suspension of the enzyme in addition to the physiological germinant is added 100 mg. of an enzyme having 67,000 units of amylase activity. To another 10 ml. aqueous suspension of the spore is added, in addition to the physiological germinant, 100 mg. of an enzyme having 67,000 units of amylase activity, 44,000 units of alkaline protease activity and 80,000 units of neutral protease activity. The same procedure is repeated for *B. stearothermophilus* except that glucose is substituted for inosine.

Following this procedure, the half-times in Table 3 were obtained.

TABLE 3

| | Half-time in minutes | | |
|---|---|---|---|
| | Buffer-physiological germinant | Buffer-physiological germinant plus amylase | Buffer-physiological germinant plus amylase plus alkaline protease plus neutral protease |
| B. megaterium | 280 | 73 | 60 |
| B. stearothermophilus | >500 | 92 | 90 |

A visual examination also showed that about 50% of the spores in each instance were germinated.

As can be seen from the above table, the presence of physiological germinants and amylase decreased the time for the germination phase. Also the addition of supplemental enzymes further decreased the germination time.

EXAMPLE IV

The viability of *B. megaterium* is determined by adding 100 mg. of amylase having 67,000 units of activity to a 10 ml. aqueous suspension of *B. megaterium* having a spore concentration of $10^8$/ml. and buffered with 0.1 M sodium phosphate and 1 $\mu$M per ml. of spores of inosine. After the amylase is in contact with spores for various time intervals, survivors are determined by plating in triplicate suitable dilutions of the spore suspensions. 2% nutrient agar supplemented with 0.1% starch is used. The plates are incubated for 16 to 24 hours at 37° C. The colonies are counted according to plate count techniques and percent viability determined.

The heat resistance is determined by preparing another suspension of spores, as described above. At various time intervals, a suitable dilution of spores is withdrawn and subjected to a temperature of 85° C. for 15 minutes. The dilutions are then plated and the colonies counted to determine the percent survivors.

By using the procedure set forth, the following results were obtained.

TABLE 4

| Viability, percent survivors | | Heat resistance, percent survivors | |
|---|---|---|---|
| Time, min. | Amylase | Time | Amylase |
| 0 | 100 | 0 | 100 |
| 30 | 83 | 30 | 57 |
| 60 | 41 | 60 | 29 |
| 90 | 17 | 90 | 12 |

Since the germination half-time for *B. megaterium* is 50 minutes, total germination time 100 minutes, by the time germination is complete, a substantial majority of the spores will not continue to develop during the outgrowth phase. Additionally, heat resistance is acquired by the spores at faster rates than some of the other characteristic changes of germination.

EXAMPLE V 100 mg. of an enzyme having 67,000 units of amylase activity, 80,400 units of neutral protease activity and 44,000 units of alkaline protease activity is added to each of the following 10 ml. spore suspensions, (1) *B. megaterium* spore concentration 10⁸/ml., buffered with 0.1 M sodium phosphate and 1 μg./ml. of inosine, (2) *B. stearothermophilus*, spores concentration 10⁸/ml., buffered with 0.1 M sodium phosphate and 1 μg./ml. of inosine, and (3) *B. subtilis*, spore concentration 10⁸/ml. buffered with 0.1 M sodium phosphate and 1 μg./ml. of glucose.

The spores are pretreated with sublethal heat 65° C. for 20 minutes. The decrease in germination half-times is determined by utilizing optical density $O.D._T/O.D._I$ techniques.

Following this procedure, the following results were obtained:

TABLE 5

| | Min. |
|---|---|
| *B. subtilis*: | |
| No heat | 70 |
| Sublethal heat | 40 |
| *B. megaterium*: | |
| No heat | 30 |
| Sublethal heat | 10 |
| *B. stearothermophilus*: | |
| No heat | 160 |
| Sublethal heat | 80 |

As can be seen from Table 5, pretreatment with sublethal heat decreases germination times.

EXAMPLE VI

In order to test the effectiveness of enzymes of the present invention against natural spore contamination in canned food, the following procedure is employed. 25 two ounce cans of sliced mushrooms are treated by separately injecting 5 ml. of enzyme amylase to provide about 67,000 units per can. Cans are sealed with solder and incubated along with a control, i.e., 25 cans containing no enzymes, sealed at 37° C. for three hours on a rotary shaker. Cans are then subjected to a temperature of 105° C. for 10 minutes in the autoclave to inactivate the enzyme. Cans were allowed to cool and held at 55° C. for 30 days after which time they were evaluated. Cans are then determined to see if they have buckled or if they are swollen but not buckled. Gases produced in those cans which is the cause for swelling and even bursting of cans. When these cans are opened, a very sour odor is noted and the pH has usually decreased from about 6.2 to about 5.1. A direct microscopic observation of the liquor from the swollen cans reveals the presence of many long thin rods. These observations are characteristics of thermophilic anaerobilic spoilage frequently encountered in canned mushrooms. At the end of the storage period, control and enzyme treated cans are opened. The enzymes had no observable effect on the mushrooms and the overall quality of the enzyme treated mushrooms appeared to be as high as control mushrooms.

The same procedure is used with the exception that 25 cans of mushrooms are injected with an enzyme having 67,000 units of amylase activity, 70,000 units of alkaline protease activity and 120,000 units of neutral protease activity.

EXAMPLE VII

The procedure of Example VI is followed with the exception that about 1 ml. of 0.1 M L-alanine is injected into the can of mushrooms along with the amylase.

In another procedure the physiological germinant is used along with an enzyme having 67,000 units of amylase activity, 70,000 units of alkaline protease activity and 120,000 units of neutral protease activity.

It is to be understood that the following claims constitute a part of the description of the present invention and consequently are to be considered as such.

What is claimed is:

1. A method for promoting the germination of spores of bacteria selected from the group consisting of Bacillus genera and Clostridium genera which comprises contacting said spores with an amylase enzyme, said amylase being present in an amount to provide about 500 units of activity per $10^3$ to $10^9$ spores.

2. A method according to claim 1 wherein said spores are additionally contacted with a member selected from the group consisting of a supplemental enzyme selected from the group consisting of proteases and phosphatases, a physiological germinant or mixtures thereof.

3. A method according to claim 2 wherein said spores to be germinated are selected from the group consisting of *Bacillus subtilis* spores, *Bacillus megaterium* spores and *Bacillus stearothermophilus* spores.

4. A method according to claim 2 wherein said spores are germinated at a temperature of about 25° C. to about 50° C., said amylase enzyme is present in an amount to provide about 10,000 units of activiity to about 1,000,000 units of activity per about $10^3$ to about $10^9$ spores.

5. A method according to claim 2 wherein said spores are in an aqueous medium.

6. A method according to claim 2 wherein said spores before germination are heated at a temperature of from about 40° C. to about 125° C. for a period of about 30 seconds to about 60 minutes.

7. A method according to claim 2 wherein said spores are contacted with said amylase and with an alkaline protease supplemental enzyme at a temperature of about 35° C. to about 45° C., wherein said amylase is present in an amount to provide about 10,000 units of activity to about 1,000,000 units of activity per $10^3$ to about $10^9$ spores and wherein said supplemental enzyme is present in an amount to provide about 10,000 units of activity to about 500,000 units of activity, per $10^3$ to about $10^9$ spores.

8. A method according to claim 2 wherein said physiological germinant is selected from the group consisting of L-alanine, inosine, glucose and mixtures thereof.

References Cited

UNITED STATES PATENTS

| 3,276,840 | 10/1966 | Sierra | 195—96 |
| 3,328,178 | 6/1967 | Alderton | 99—215 |

ALVIN E. TANENHOLTZ, Primary Examiner

U.S. Cl. X.R.

99—215; 195—62, 63; 21—2